Nov. 27, 1951 — J. C. RAMSEY — 2,576,360
HUNTING QUIVER FOR HUNTING ARROWS
Filed April 5, 1948 — 2 SHEETS—SHEET 1
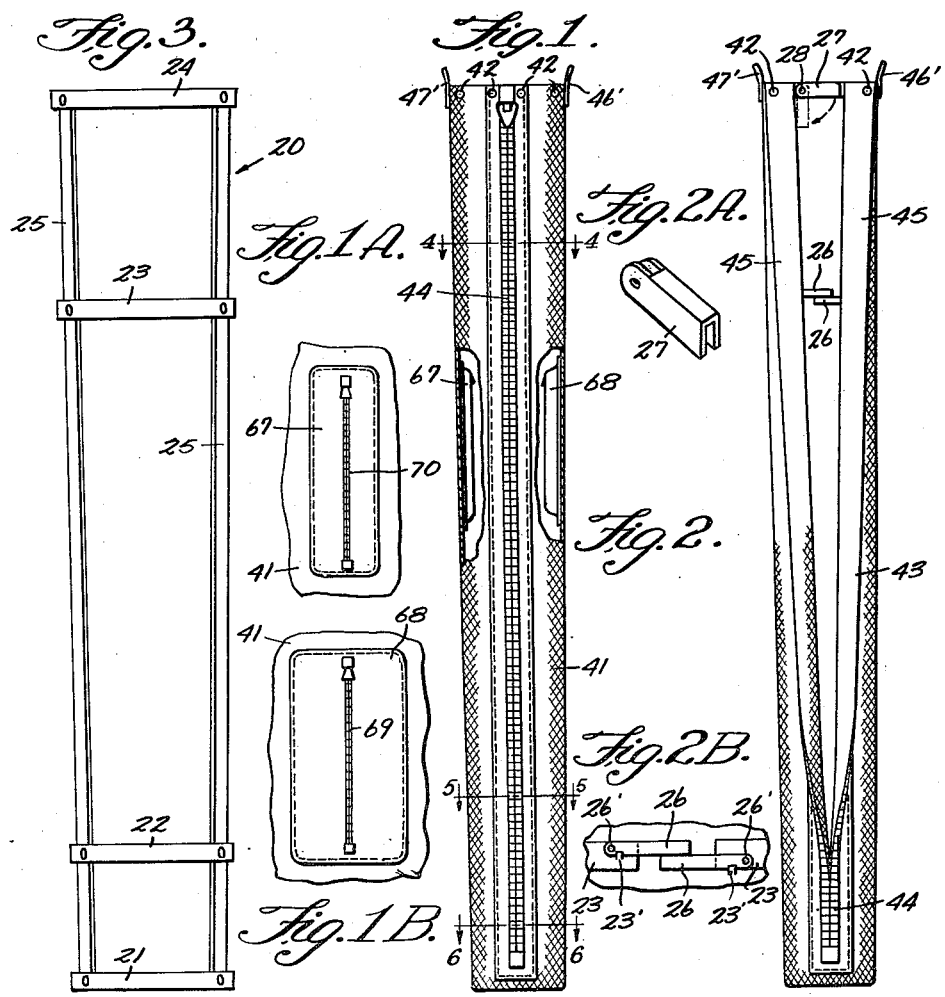
INVENTOR.
James C. Ramsey,
BY Victor J. Evans & Co.
ATTORNEYS Nov. 27, 1951     J. C. RAMSEY     2,576,360
HUNTING QUIVER FOR HUNTING ARROWS
Filed April 5, 1948     2 SHEETS—SHEET 2
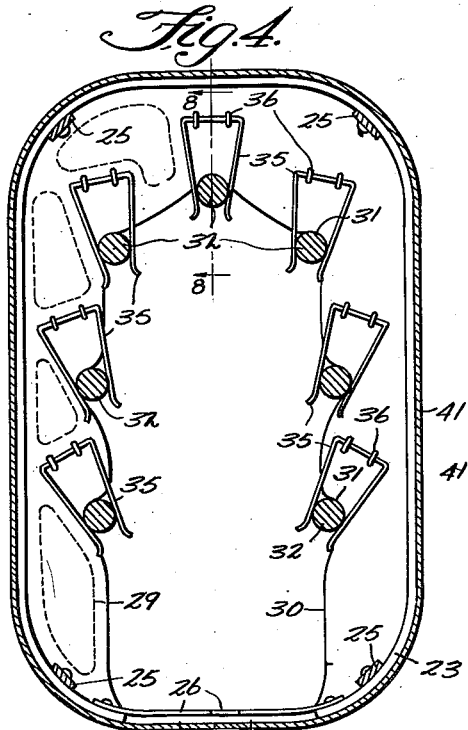
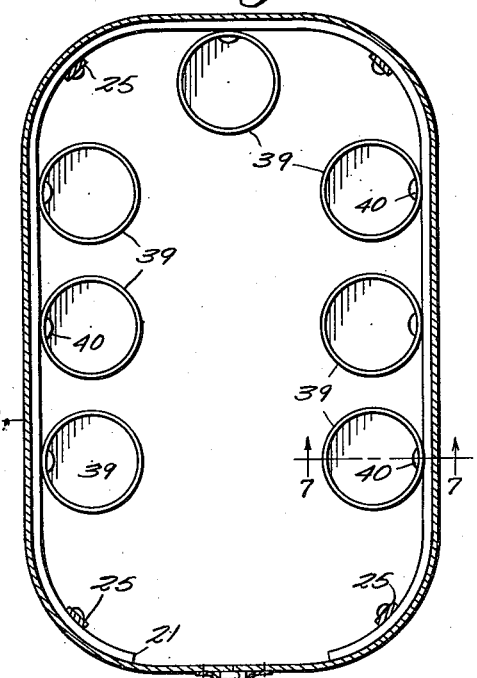
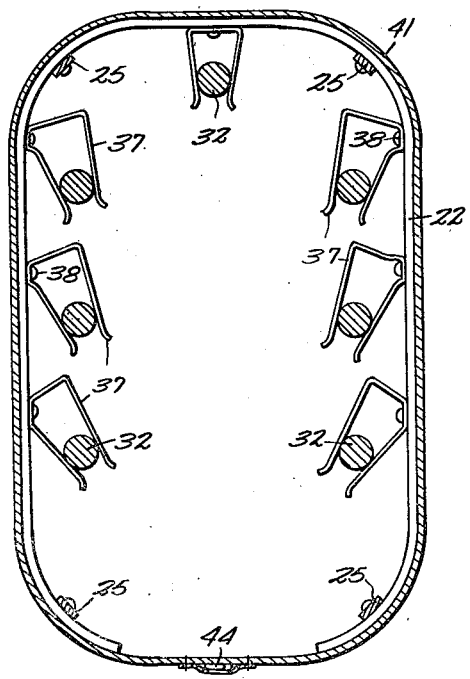
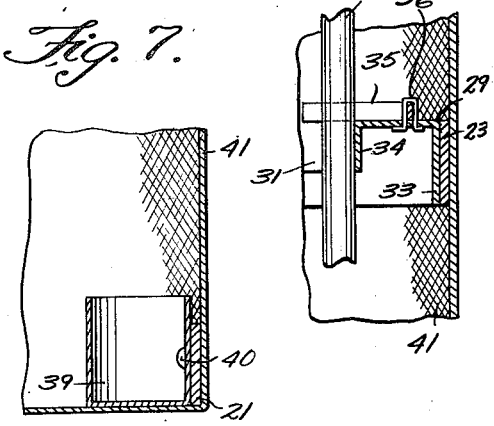
INVENTOR.
James C. Ramsey,
BY Victor J. Evans & Co.
ATTORNEYS Patented Nov. 27, 1951

2,576,360

UNITED STATES PATENT OFFICE 2,576,360

HUNTING QUIVER FOR HUNTING ARROWS

James C. Ramsey, Lincoln, N. Mex.

Application April 5, 1948, Serial No. 19,097

3 Claims. (Cl. 150—1.5)

This invention relates to an improved hunting quiver that I have developed, that is designed to entirely eliminate or else greatly minimize to some extent the various objectionable features that are to be found in even the best of quivers hitherto carried by bow hunters.

Of these objectionable features present, one of the worst ones, and probably the one responsible for more disappointment and failure in the hunting of big game with the bow than any of the others, is that the arrows carried loose in the quiver, as they usually are, jar and shift about with the movements of the hunter. The heads of the arrows, finely sharpened though they may have been at the start, and as they should always be kept when hunting large animals, shift and slid about and chafe against one another and loose their desirable keenness and often become considerably dulled, so that when the arrows are drawn out and shot into big, tough-skinned game, the broadheads are far from being in a proper and fit condition to function to maximum efficiency.

In the superior hunting quiver that I have developed many objectionable features and disadvantages are practically eliminated, as will be shown directly.

Now, in hunting wary and alert big game, or dangerous animals with the bow, it is very desirable that the hunter's quiver be so constructed as to embody the following advantageous features.

First, the head of each arrow carried in this quiver is held in its own proper place so that it cannot shift about and chafe against the other arrowheads and become dulled. The keen points and edges are protected at all times in the quiver, so that they remain just as sharp as when inserted, and when withdrawn to be shot at game, they are in proper condition to function to maximum efficiency.

Each arrow shaft in the quiver is held in its own separate place, and cannot shift about and rustle and rattle and cause any sound that might warn wary and alert game.

Also, the shafts not being subject to any curving pressure of the body, are not encouraged to become crooked while being carried in the quiver.

The feathers of the arrows contained in this quiver are held separate and apart, and cannot jostle or lie against one another and become crushed or distorted out of proper shape and alignment. Being protected by the upper portion of the quiver, they are not snagged or damaged by twigs or other external menaces. They are greatly protected from rain and snow, and can very easily be fully protected merely by slipping a little hood of suitable material over the mouth the the quiver. Since the upper end of this quiver is designed to be held in its proper open shape, the feathering of the arrows is not damaged by the arm or body of the hunter squeezing the quiver walls against it. Therefore, when an arrow is drawn out of this quiver to be shot at game, the protected feathering is properly erect and in correct alignment to guide the wide, sharp broadhead in its true and proper course.

Besides doing much to bring the bowhunter success in his quest of game, this quiver saves him much bother and expense by thus protecting his choice hunting arrows.

And since each arrow in the quiver is held separately in its proper place, when the hunter comes in from a hunt, he does not need to go to all the bother of removing the arrow from it, but may just hang it up as he chooses with them in it and rest assured that their feathering will not be ruined by their being crowded together against one another, which, naturally, is a great convenience, especially when one is out in camp on a hunt, and comes in late in the evening, and wishes to be up and away on the hunt again early the next morning.

Also, this quiver serves admirably as a light carrying case for hunting arrows when traveling, and may be rolled right up in the hunter's bed roll, and be transported to the hunting area on a pack animal, or by any other desirable means, without the arrows contained in it suffering any damage whatever.

But in this highly developed hunting quiver, means are provided whereby the arrows may be gotten out with even greater ease and convenience. They do not need to be drawn clear up out of the mouth of the quiver. The quiver is so constructed that one side, preferably the narrower one toward the front, may be opened down as far as desirable and left so, when actually hunting, and the arrows so arranged that they may be slipped right over and out of the open space of the quiver's side for much of their length, then the remaining portion drawn on out. This arrangement does away with a lot of extra movement that could be a dead give-away to an alert and watchful deer or other wary game.

This opening at the quiver's side also permits of easy insertion of the arrows in their proper clasps and scabbards in the quiver.

Not only is this quiver the best one to use when hunting afoot, but it is also the most convenient one to carry when hunting on horseback.

In its preferred form, this improved hunting quiver that I have developed, consists of a light, yet strong, framework over which the covering of the quiver fits, two series of properly arranged shaft-holding clips, and a series of conveniently arranged arrowhead-holding sheaths, the covering material of the quiver, and the quiver straps by which it is slung in the most convenient and preferable position on the hunter's person.

With the above and other objects and advantages in view, the invention consists of the novel details of construction, arrangement and combination of parts more fully hereinafter described, claimed and illustrated in the accompanying drawings in which:

Figure 1 is an elevational view of the "zipper" fastener for the cover of the quiver in closed position and partly broken away to show the pockets formed on the interior of the cover;

Figure 1a is an elevational outer view of one pocket;

Figure 1b is an elevational outer view of the other pocket;

Figure 2 is an elevational view of the quiver with the "zipper" in open position;

Figure 2a is a perspective view of the pivoted connector for one of the circular bands;

Figure 2b is a detailed fragmentary view of the free ends of the circular bands forming the framework of the quiver;

Figure 3 is an elevational view of the framework of the quiver;

Figure 4 is a cross-sectional view on the line 4—4 of Fig. 1 of my quiver showing the manner in which the arrows are retained in the quiver;

Figure 5 is a similar cross-sectional view on line 5—5 of Fig. 1 of my quiver taken at a lower position therein;

Figure 6 is a similar cross-sectional view on the line 6—6 of Fig. 1 taken at a lower position than the section 5—5;

Figure 7 is a fragmentary sectional view on the line 7—7 of Figure 6;

Figure 8 is a fragmentary sectional view on the line 8—8 of Figure 4.

Referring more in detail to the drawings, it will be seen that my improved hunting quiver comprises a framework 20 (Figure 3) which is composed of four circular bands 21, 22, 23 and 24 respectively, which are secured in spaced parallel relation to each other by the four staves or stays 25 which extend lengthwise of the quiver.

The bands may be made of any suitable material, but they should be as thin and light as possible, and still maintain the required strength and stiffness. The band 21 is the smallest in circumference, and the band 24 the largest, so that the overall shape of the framework tends to flare outwardly and upwardly from the bottom band.

The first, or uppermost band 24, extends almost completely around the inside of the quiver just below its mouth, and holds it spread open properly. At the front, or on that side of the quiver that may be opened when desired, the ends of the band are slightly spaced to permit the feathered portion of a hunting arrow to pass between them without touching enough to harm the fletching. The upper end of one of the thin, strong, stiff stays 25 is attached firmly at one end of this band 24, and just across the open space, the upper end of another stave is attached to the other end of band 24. Rearwardly from the first stay 25, along the circular band 24 on one side, nearly to the side opposite the open one, the upper end of another of the stays 25 is firmly attached. Directly across on the opposite side, the upper end of the remaining stave 25 is made fast to band 24. The next lower band, 23, extends similarly around the outside of the frame immediately below that space occupied by the feathered portion of the arrows contained in the quiver. This band 23 is, likewise, left open on the same side as band 24, and near its ends, is attached in the same way to the staves 25, as previously described.

This band 23 extending around the inside of the quiver, without the four stays, is, as are the other bands, detachably attached, so that it may be loosened and removed from the frame, at will.

To guard against an arrow ever accidentally slipping from the open side of the quiver and being lost, especially when the quiver is in a horizontal position with the open side downward, as when the hunter is creeping on his hands and knees, the ends of the band 23 are each provided with a small, light spring strip 26 affixed at its inner end by a rivet or a small bolt 26' to each end of the band 23, and extending out across the open space to just a bit more than half way, and being retained in such position by fitting on and back of a little nib 23' pressed outward from the band material or of separate material riveted at this point to the band. By lifting up on the spring strip 26, it may be slipped out from the nib 23' and turned on rivet 26' back down behind the quiver cover, out of the way, when it may be desirable to use the quiver without this retaining medium in place. The opposite spring strip 26 attached to the other end of band 23 extends in like manner out across the open space from the opposite side. Thus a bit of the free end of each little spring lies edge to edge with that of the other, as shown in Figure 2b. These two small spring strips 26 are sufficiently strong that an arrow resting against them, even in a horizontal position, will not, of its own weight and pressure, force the ends apart enough to allow the shaft to pass between, but they are weak enough that under the force of the hunter's fingers against the upper end of the arrow, they will readily part and allow it to slip out. The band 24 is equipped with a pivoted bridge piece or connector 27 which is adapted to close the gap between the ends of the band 24 when desired.

The connector 27 is used in order to hold the ends of the band 24, or it may be used with the other bands if desired to firmly hold the ends of the bands together in place when the quiver is not actually in use in hunting, or is employed as a carrying or packing case for arrows.

The connector 27, Fig. 2a, is U-shaped in cross section to enclose the free ends of the band, and pivoted at 28 on one end of the band. This connector 27 is of proper length to bridge the normal gap between the two ends of the band 24, and is formed by the material being folded over lengthwise. The connector 27 being U-shaped the lower side edge of the connector is open, and the free end of the connector 27 is fitted over the other end of band 24 and the pivot 28 allows the connector to be turned downward behind the quiver cover, out of the way, when it is not actually in use as a brace closing the gap between the ends of band 24. The other end of this connector is recessed or slotted to provide opposed apertured ears into which the other end of band 24 is fitted and through which a pin is passed at 28 to pivotally connect the connector 27 to the band 24. The pivot pin is positioned in the other end of the band 24 so that the socket will slip only the desired distance onto the end of band 24. Thus, when this connector 27 is fitted in place, the ends of the band 24 are held in it, firmly and snugly, so that the quiver will not squeeze shut and damage the arrows contained in it. When the gap between the ends of the band is needed for the more convenient withdrawal of arrows, the connector is merely slipped off the free end of the band 24 and turned downward on the pin 28 hinging it to the other end of the band, and left there out of the way behind the cover of the quiver, the squeezing tension of the edges of the end of the piece retaining it in place. Each of the bands of this improved quiver may be provided with such a connecting piece, if desired.

Since bands 24 and 23 of the framework are designed to hold the walls of the quiver spread apart in proper shape, so that fletching of the arrows will not be crowded together and injured, they are made of stiff, springy material that will retain the correct curve and contour under the ordinary pressure of the hunter's arm or body.

However, should more than the usual pressure force a band closed, each free end is so arranged that it presses against its mate and will close only just that much, and no more, and as soon as the excessive presure is relieved, the stiff, springy band will immediately recover its normal shape and spread position.

Secured to the band 23, and extending around within the band and following its general curve and extending at a proper distance within the quiver, is a strip or plate 29. The inner edge 30 of this plate has rounded indentations or notches 31 at intervals, to receive the arrow shafts 32 resting against them. This arrow rest area or plate 29 extends around the quiver at a proper distance within it to hold the arrows far enough from the quiver wall to prevent their feathering from being crushed and damaged against it. This strip or plate is held in position on band 23 by a depending flange 33, and the notches 31 are backed by the depending flange 34.

The plate 29 may also be formed by turning over the upper portion of band 23 upon itself to form the plate and band together in one continuous piece. However, since maximum lightness consistent with required strength is very desirable, part of the plate may be cut out, as shown in dotted lines in Figure 4.

To hold each arrow shaft 32 in its proper notch 31 in plate 29, each notch 31 is provided with a clip or gripper 35. The mouth of each clip 35 opens toward the opening of the quiver, so that the arrows may be easily slipped right out the open side of the quiver. The base of each clip is fastened to the plate 29 by fasteners 36 and these clips may be made of any material or combination of materials suitable or desirable, such as boar bristles, horn, rubber, metal, plastic, etc. The inner surface that grips the arrow should be of such material and configuration as to prevent undue slipping or rattling or injury to the shaft. Likewise, each notch 31 of plate 29 should be lined with some non-slipping material.

The third band, 22, extends around the quiver on the inner side near the lower end, anywhere from a few inches to several inches up from the space occupied by the heads of the arrows contained in the quiver. This band 22 is also open on the same side as the openings of bands 23 and 24, and stays are similarly attached at the proper distance from their lower ends.

The band 22 is provided with small, springy clips 37, spaced to match the notches 31 and clips 35 of plate 29. The clips 37 are of the same shape as clips 35, and may be so fashioned, shaped, curved or bent in any manner desirable to best hold the arrows, in cooperation with the clips 35 on the band above, in their proper place in the quiver and yet provide the most convenient and ready means of permitting each to be slipped loose and withdrawn. The clips 37 may be either fixedly or movably and adjustably attached to the framework band 22 as at 38, or they may be fixed to the quiver cover itself if desired, if the cover material is stiff and substantial enough to warrant dispensing with the bands and staves of the framework. The springy clips 37 may be made of any material or combination of materials suitable for the purpose and are preferably lined with soft rubber or leather, etc., to aid them in gripping the arrow shafts better, and to prevent the arrows held in them from making any sound.

The lowermost band, 21, or the bottom one of the quiver framework, extends around near the botttom of the quiver on the inside, and is attached to the lower ends of the staves 25 affixed to the three bands above. The band 21, however, may be either left open a bit on the open side of the quiver, or its ends may be fastened permanently together.

Where the covering material of the quiver is substantial and stiff enough to serve without them, any of the band and stays of the framework may be dispensed with, particularly band 24 at the top, and bands 22 and 21 of the lower portion, and one or two of the staves 25. On the other hand, if desirable, as when the quiver is made very large, more bands and more stays may be added to the framework, being placed at such locations deemed necessary.

Provided at the bottom of the framework 20, are the sheaths 39, which may be made of any suitable material or combination of materials, preferably something flexible such as leather or rubber. They are formed and shaped about as illustrated in Figures 6 and 7, being capable of holding a single bladed arrowhead, or one with three edges, or one with four edges, since the material is flexible enough to alter its shape to fit any head used.

The sheaths 39 may be attached either fixedly or movably and adjustably in any manner or position desirable either to the lower framework band 21, as at 40, or directly to the lower end of the quiver cover itself.

Since this quiver is especially designed to be opened down the front to allow the hunting arrows to be more easily and conveniently inserted or withdrawn, and since it is often desirable to carry it with that side thus open, especially when actually hunting, the quiver covering 41 at each side of the opening space is snugly and neatly detachably attached with snaps like glove snaps to the two lengthwise staves 25 at several points along their length, to prevent the cover from sagging or flopping open more than the required distance to allow the feathering of an arrow to pass through readily.

The covering 41 of the quiver may be of any suitable material, and is preferably removably affixed over the framework 20 by any convenient means, such as with snaps 42, like glove snaps, so that the framework may be slipped out when desired, and the cover used just as an ordinary light quiver.

If desired, the quiver may be lined with some suitable material snap fastened around on the inside of the framework, or it may be left unlined.

The broadhead of each arrow is held in its particular place in the quiver by the scabbard-like sheath 39 which serves as a protecting sheath or covering for the arrowhead, thereby preserving the keenness of its point and edges.

At the opening 43 of the cover 41, the edges of the cover are provided with some suitable means by which the quiver may be readily and conveniently opened and closed, preferably with a "zipper" 44, though snaps, or hooks and eyes, or little straps and buckles or buttons, or hooks, or eyelets and a lace, may be used for the purpose.

When the quiver is being used with the front side open, the two flaps 45 of the cover are doubled back from the opening 43 and each retained in place there by a snap 42, one portion of the snap being attached to the outer side of the flap and the other part affixed at the proper location on the cover proper, as shown in Figure 1, or the flaps may be held open by a little nub or hook or by a little thong, a button, or a buckle and strap, etc.

At the brim of the quiver mouth, on that side that lays against the hunter's right side, and about an inch back from the front, a little loop 46', an inch or more long, of some strong, pliable material, such as buckskin or leather, is securely attached. About an inch from the rear, on that same side, a similar loop 46 is likewise attached. If the quiver is intended to be worn at the left side of the person, then these loops must, of course, be fixed at the opposite side of the quiver mouth. Or, and preferably so, such loops 46 and 46' and 47 and 47' respectively, may be furnished on both sides of the quiver, so that it may be worn at either side of the body as desired. Though buckskin or leather is preferable, these loops, as well as all others on this quiver, may be rings or eyes of metal or other material, and of such size as desired.

Archers who hunt with the bow should always carry an extra string, and a small file with which to sharpen their arrowheads. It is desirable that these be carried right with the hunting quiver itself, along with the hunting arrows, so they will not be misplaced or forgotten. A pocket or scabbard added on the outside of the quiver to contain them has certain objectionable features that ought to be avoided in this improved quiver that I have developed. Not only do they bulge out rather unsightly, but they form a hump, or projection, that is somewhat in the way at best, and, if lying against the body, can become a source of considerable annoyance and unpleasantness. Since my improved quiver is designed so that either side of it can be worn against the back, or at the side or hip, such a pocket on the outside would very likely prove an objectionable addition.

Therefore, that this improved quiver may be more efficient and complete, a narrow sheath 67 for a file is added to the inside of the quiver on one side, a little way below band 23, where it is out of sight and out of the way, yet is readily accessible through the opening of the quiver's front side. On the opposite side of the quiver, also within it, a small bowstring pocket 68 is added. Even when filled, these are flat enough that they lie between the quiver wall and the arrow shafts 32 and do not protrude out into the quiver in the way. The general position of the file sheath 67 and string pocket 68 within the quiver is indicated in Figure 1.

The string pocket 68 is made of suitable size and is fastened directly to the quiver wall, so that the quiver cover becomes the back of the pocket. The pocket has a slit lengthwise of its center, which is closed and opened by a "zipper" 69, through which the bowstring or other articles are inserted or removed. However, if desired, this slit may be in the quiver cover itself, instead, so that the pocket is accessible from the outside of the quiver.

Also, if desired, instead of a "zippered" opening lengthwise of the pocket, the pocket may be cut so as to have a mouth at the end or along the side next the opening in the cover.

The file sheath 67 of Figure 1a is made in suitable size just as is the string pocket 68. This sheath may likewise be varied as to its opening, being provided either with a slit lengthwise closed with a "zipper" 70, either in the pocket or in the quiver cover itself, or a mouth at the upper end or at the outer edge closed with a snap fastened flap.

Obviously my improved hunting quiver lends itself to various ornamentation and embellishment as readily as the ordinary quiver.

Having thus described this improved hunting quiver, and set forth its various advantages and novel features, it is evident that various changes, modifications, substitutions, additions and eliminations may be resorted to, without departing from the broad scope of my invention, and I do not desire to limit myself in all respects to the exact and specific disclosures hereof, but desire to protect my invention in the broadest manner legally possible.

I claim:

1. In an arrow quiver having a frame and a cover for the frame, said frame including a circular band intermediate its length, the improvement comprising an inverted U-shaped member, one leg of which is secured to and conforms to the shape of said circular band, the other leg of said member having indentations at intervals along its surface to receive arrow shafts, a clip fixed to the base of said U-shaped member at each indentation and extending over the indentation to hold the arrow shaft below its feathering, whereby the feathering will be spaced from contact with the quiver cover.

2. An arrow quiver having a covering provided with a longitudinal opening therein and containing within it a framework composed of a plurality of longitudinal staves and a number of spaced circular bands secured to said staves, said bands increasing in size from the bottom toward the top thus forming a framework tapering toward the bottom whereby the framework is removable from said covering, the ends of each band above the bottom band being spaced apart so as to form a longitudinal opening in the framework in registry with the opening of said covering, an inverted U-shaped member, one leg of which is secured to and conforms to the shape of the band below the top band, the other leg of said member having indentations at intervals along its surface to receive arrow shafts, a clip fixed to the base of said U-shaped member at each indentation and extending over the indentation to hold the arrow shaft below its feathering whereby the feathering will be spaced from contact with the quiver cover, and arrowhead scabbards secured to the bottom band of said framework and means for closing said cover opening when the quiver is not in active hunting use.

3. The invention as in claim 2 wherein the spaced ends of said band below the top band is provided with opposed spring members, said spring members extending toward each other in overlapping relation across said space whereby the arrows will be held from accidental displacement during active hunting use.

JAMES C. RAMSEY.

REFERENCES CITED

The following references are of record in the file of this patent:

UNITED STATES PATENTS

| Number | Name | Date |
|---|---|---|
| 514,808 | Bertrand | Feb. 13, 1894 |
| 972,277 | Spikes | Oct. 11, 1910 |
| 1,570,500 | Kennedy | Jan. 19, 1926 |
| 1,756,902 | Boyce | Apr. 29, 1930 |
| 1,796,775 | Warren | Mar. 17, 1931 |
| 2,003,733 | Bishop | June 4, 1935 |
| 2,217,353 | Wyman | Oct. 8, 1940 |
| 2,351,675 | Gengler | June 20, 1944 |
| 2,367,234 | Mitchell | Jan. 16, 1945 |
| 2,419,175 | Spohrer | Apr. 15, 1947 |

FOREIGN PATENTS

| Number | Country | Date |
|---|---|---|
| 291,934 | Great Britain | June 14, 1928 |
| 8,402 | Australia | Apr. 13, 1933 |